Dec. 12, 1950  R. A. HARTMAN  2,533,797
FASTENING DEVICE
Filed Oct. 20, 1947
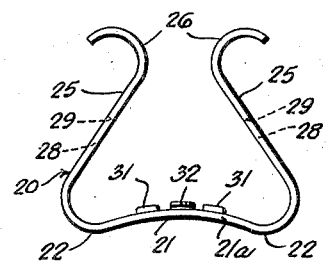
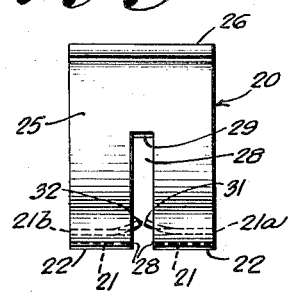
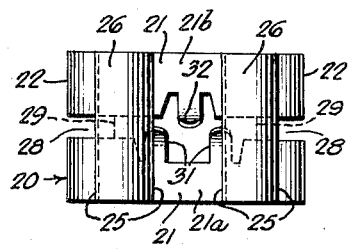
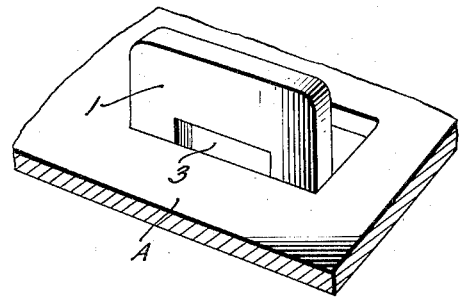
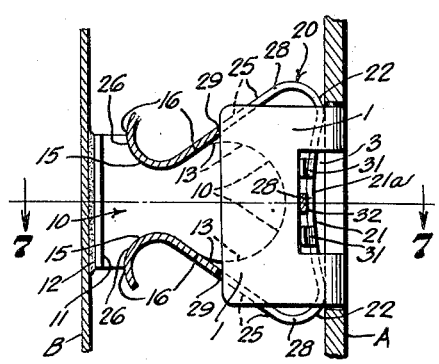
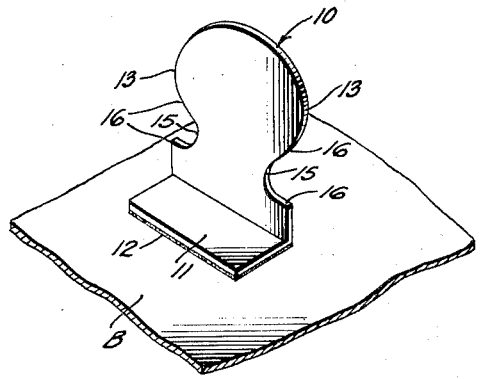
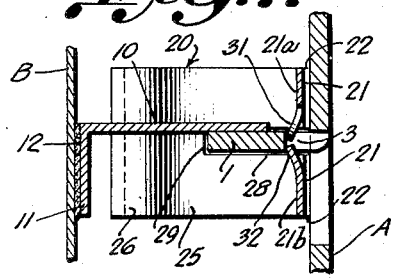
INVENTOR.
RICHARD A. HARTMAN
BY
H. G. Lombard
ATTORNEY Patented Dec. 12, 1950

2,533,797

UNITED STATES PATENT OFFICE 2,533,797

FASTENING DEVICE

Richard A. Hartman, Cleveland, Ohio, assignor to Tinnerman Products, Inc., Cleveland, Ohio, a corporation of Ohio Application October 20, 1947, Serial No. 780,871

4 Claims. (Cl. 24—201)

This invention relates in general to an improved fastening means for panel mountings and joint constructions provided therefor in the fabrication of sheet metal structures such as ranges and various cabinet constructions, and the like.

The principles of the invention find particular application in structures wherein a panel member serving as a trim surface, receptacle cover or closure plate, or the like, must be firmly and rigidly secured against accidental displacement and disassociation from the supporting structure but adapted for ready removal for repairs or to permit inspection and adjustment of working parts normally concealed thereby.

The invention is particularly advantageous in blind fastening installations as a securing means operating in the manner of a spring catch to mount a finish panel, or the like, to a supporting structure by an operation taking place entirely from the outer or readily accessible side of the installation. As an example, in the mounting of a panel in the form of a toe plate onto the frame of a stove or range, the fastening operation is effected entirely from outside of the range in a minimum of time and effort without need for access to the interior of the range or the reverse side of the frame on which the toe plate is mounted in the completed installation.

In similar and related installations, the panel may be provided in various forms for different applications and uses in the manner of a removable cover plate or door, and particularly, as a closure for service openings in structures wherein it is necessary or desirable to provide for quick and easy access to a normally concealed operating mechanism for inspecting or adjusting purposes, or otherwise repairing or replacing a damaged part of such operating mechanism.

A primary object of the invention is to provide a panel mounting and panel joint construction of this character comprising an improved spring catch provided with combined securing and attaching means, the securing means being engageable with a snap fastener on the panel in the manner of a spring catch for removably retaining the panel in mounted position in cooperation with the attaching means thereof united to an integral connecting stud on the supporting structure and concealed by the panel in mounted position on the supporting structure.

Another object of the invention is to provide a panel mounting or joint construction comprising such a spring catch which is designed for attachment directly to a connecting stud on the supporting part without the use of bolts, screws, rivets or other separate attaching means, thereby providing for important savings in the cost and application of such separate attaching means and speed and economy in mass production methods of assembly.

A further object of the invention is to provide a fastening arrangement of this character in which the spring catch includes an improved clip-type attaching means adapted for positive connection to the connecting stud on the supporting part to retain the spring catch in firm and rigid attached position for engaging a cooperating snap fastener.

Another object of the invention is to provide a fastening installation of the kind described in which the spring catch comprises a special tongue formation adapted for positive interlocking connection in an aperture in the connecting stud on the supporting part in a manner whereby the spring catch is fixedly retained under spring tension in attached position for engaging a cooperating snap fastener.

A further object of the invention is to provide a removable panel mounting embodying such resilient spring catches which are designed for attachment to the main or supporting structure of an assembly in an inconspicuous, concealed position, and in a simple, inexpensive and expeditious manner to provide a reliable and durable panel mounting in which the panel is not subject to accidental loosening, displacement or unintended removal in the normal operation and use of the assembly.

Further objects and advantages, and other new and useful features in the construction, arrangement and general combination of parts of the invention will be readily apparent as the following description thereof proceeds with reference to the accompanying drawings, for purposes of illustration but not of limitation, in which like reference characters designate like parts throughout, and in which:

Fig. 1 is an edge elevational view of the spring catch employed in the improved fastening installation of the invention, Fig. 2 is a side elevational view of the spring catch shown in Fig. 1;

Fig. 3 is a top plan view of the spring catch shown in Figs. 1 and 2;

Fig. 4 is a perspective view illustrating the provision of the apertured connecting stud on a supporting part to which the spring catch of Figs. 1 to 3 inclusive is attached;

Fig. 5 is a perspective view illustrating the cooperating strike or snap fastener on a part to be mounted which is designed for snap fastening engagement with the spring catch of Fig. 1-3 inclusive;

Fig. 6 is a sectional view illustrating a typical installation in which the spring catch and cooperating snap fastener are attached to opposing panel members, or the like, to secure the same; and, Fig. 7 is a sectional view of Fig. 6 taken along line 7—7, looking in the direction of the arrows, and illustrating the positive interlocking connection of the spring catch as attached to the integral connecting stud on the supporting part and otherwise engaging the cooperating snap fastener on the part secured to said supporting part.

Referring now, more particularly, to the drawings, Figs. 6 and 7 are sectional views illustrating a panel joint for a typical installation of a removable panel in accordance with the invention as provided, for example, for mounting a panel in the form of a toe plate onto the frame of a stove, range or other cabinet structure. The usual range or other cabinet structure is of the general character which comprises a frame construction composed of supporting members in the form of metal plates, panels, or the like forming a part of the outer exposed surface of the range or other cabinet structure. In the mounting of a trim panel, cover plate, or other closure onto such a supporting part, it is of course desirable that the mounting installation take place by an operation which may be effected entirely from the outer or readily accessible side of the supporting part without need for access to the interior of the frame structure for attaching the particular fastening means employed.

In the present example, the part A represents any frame portion, plate, panel or other supporting member forming a part of the cabinet structure, or the like, such as the frame of a range to which a toe plate in the form of a metallic panel B is attached by an operation taking place entirely from the outer side of said part A. To this end, the improved fastening means of the invention comprises a suitable number of spring catches 20 which are easily and quickly attached to the supporting part A from the forward side thereof and securely retained in attached position for snap fastening engagement with cooperating snap fasteners on the part to be mounted on said supporting structure.

Such a spring catch, designated generally 20, is attached to the supporting part A by means of a connecting stud 1 provided on said part A either as an integral projection struck and formed therefrom or as a separate element secured thereto in any suitable way by bolts, screws or other fastening means. As shown in Fig. 4, the connecting stud 1 is provided preferably by a simple, integral lug which is partially severed from said part A and bent outwardly out of the plane of said part to generally normal relation thereto. An elongate aperture 3 is provided in said lug adjacent its junction to said part A and otherwise has its corners slightly rounded to facilitate the attachment of the spring catch 20 thereto. Such an integral apertured connecting stud as advantageous in that it is relatively inexpensive to provide in the manner of a simple lug which may be stamped and formed together with the elongate aperture 3 in the same stamping and forming operation by which the supporting part A is provided in the required design for any particular type of installation.

On the associated part B to be mounted or connected to the supporting part A, a cooperating snap fastener 10 is provided in the form of a projecting shank or strike designed for snap fastening engagement with the spring catch 20. Such a shank element may be provided in any desired form and attached to the part A in any suitable manner. Preferably, said snap fastener 10 is provided by a simple sheet metal stamping as shown in Fig. 5 having a bent end forming a head 11 for securing the fastener by welding 12 in projecting relation to the inner side of part B so that the outer surface of said part is imperforate and presents a uniform, unbroken appearance. The shank of the snap fastener 10 comprises a flat, bulbous shape in which the edges thereof are designed to provide a blunt leading end and adjacent outwardly diverging guide surfaces 13 merging into inwardly rounded recesses 15 which define spaced shoulders 16 on each edge of the snap fastener.

The spring catch 20 is a relatively simple article of manufacture which may be readily produced at low cost from an inexpensive section of any suitable sheet metal preferably tempered spring steel or cold rolled steel having spring-like characteristics. The spring catch 20 may be formed from blanks of various outlines but from the standpoint of most economical quantity production is most advantageously provided from a simple generally rectangular blank which may be obtained from standard sheet metal strip stock with little loss or waste of material. The blank is bent into the general form shown in Figs. 1-3 inclusive to comprise a central upwardly bowed or arched base 21 intermediate rounded bent portions 22 forming a pair of cooperating spring arms 25 disposed in inclined relation inwardly toward each other. The extremities of said spring arms 25 are bent outwardly from each other to define cooperating jaws 26 having rounded cam surfaces in face to face relation with each other and the rounded formation of said jaws 26 approximates that of the rounded recesses 15 defining the spaced shoulders 16 on the snap fastener 10, as aforesaid. The spring arms 25 thus provided are adapted to spread apart as necessary to admit the cooperating snap fastener 10 therebetween in edgewise relation to the faces of said spring arms, as shown in Fig. 6. The arrangement is such that the diverging guide surfaces 13 on the snap fastener 10 are adapted to cam against the cam surfaces 26 on the extremities of the spring arms 25 to cause said spring arms to spread apart as necessary to permit the snap fastener 10 to pass therebetween to a position in which the rounded jaws 26 snap into and are snugly seated in the similarly shaped rounded recesses 15 on the snap fastener shank 10 and in positive engagement with the spaced shoulders 16 defined by said recesses. Such engagement of the rounded jaws 26 with the spaced shoulders 16 on each edge of the snap fastener 10 provides a rigid connection in which the fastener is fixedly and rigidly retained by the spring arms 25 against axial displacement in either direction.

The spring catch 20 is provided with an improved form of attaching means for connecting the same easily and quickly to the apertured connecting stud 1 on part A, Fig. 4, without the use of bolts, screws, rivets, or other separate fastening devices. As shown in Figs. 2, 3, 6, and 7, a longitudinal slot or opening 28 is provided through base 21 of the spring catch 20 and the adjacent portions of the spring arms 25 to a height substantially equal to the distance that the stud 1 projects from the adjacent surface of part A. In instances where the connecting stud is defined by the free end of a flat rod or elongate tongue, the slot or opening 28 in the spring arms 25 is provided of a height equal to or slightly less than the distance between the free end of the connecting stud and the aperture 3 therein. The ends of said slot or opening 28 define abutments 29 and said slot or opening otherwise is so provided as to receive said connecting stud 1 snugly as shown in Fig. 7.

The slot or opening 28 divides the arched base 21 of the spring catch into similarly arched side or base portions 21a and 21b, Figs. 2, 3, and 7, and in the area of the apex of these arched base portions, cooperating tongues 31, 32, are provided which extend toward each other and project into the area of the slot or opening 28 between said base portions. Said tongues 31, 32, are bent slightly upwardly above the apex of the arched fastener base and are so designed as to be received readily in the aperture 3 in the connecting stud 1 from opposite faces thereof. In the specific construction shown, a pair of spaced tongues 31, Fig. 3, project from the inner edge of the arched side or base portion 21a while a cooperating similar tongue 32 projecting from the other arched side or base portion 21b extends between said spaced tongues 31.

The spring catch 20 is attached to the connecting stud by positioning the slot or opening 28 in the base thereof over the free end of the connecting stud 1, whereupon the spring catch is pushed axially of the connecting stud to the position shown in Figs. 6 and 7 in which the base portions 22 of the spring catch bear upon part A. In this position, the abutments 29 defined by the ends of the slot or opening 28 in the spring arms 25 preferably are designed to bear upon the free end of the connecting stud as shown in Fig. 6 to increase the rigidity of the spring catch in attached relation to the connecting stud.

The tongues 31, 32, are slightly yieldable with respect to the generally bowed or arched base portions 21a, 21b of the spring catch and yieldable relatively to each other in such a way that the extremities thereof are adapted to snap over the free end of the connecting stud 1 and spread apart sufficiently to slide along the flat faces of the stud to the position in which said tongues 31, 32, are free to snap into the transverse aperture 3 in the connecting stud from opposite faces thereof. The spring catch 20, accordingly, may be speedily attached to the connecting stud by a simple, axial thrust-like force by which said tongues 31, 32, are snapped into connected engagement in the transverse aperture 3 of the connecting stud as the generally bowed or arched base portions 21a, 21b, of the spring catch are pressed toward the supporting part A, whereupon the rounded bent portions 22 of the base slide slightly outwardly on the adjacent surfaces of said part A and the bowed or arched base portions 21a, 21b of the spring catch are somewhat flattened and thereby tensioned in the attached position of the spring catch. When pressure is removed from the flattened base portions 21a, 21b, they attempt to assume their initial bowed or arched formation, thereby urging the extremities of the tongues 31, 32 into positive abutting engagement with the adjacent upper wall of the aperture 3 in the connecting stud, as shown in Fig. 7. The bending of the tongues 31, 32, slightly upwardly as shown in Fig. 2 defines a flared entrance to the space between said tongues which facilitates the initial application of the spring catch over the projecting free end of the connecting stud 1 and otherwise enables said tongues to cam readily outwardly over the end edges of said stud as necesssary to pass into engagement with the flat faces of the stud and thence into interlocking relation in the aperture 3, as aforesaid. In instances where the apertured connecting stud 1 is provided by the free end of a flat rod, flat stem or elongate tongue, a similar tensioning of the base portions 21a, 21b, is provided with the tongues 31, 32, in locked abutting engagement with the upper wall of the aperture 3 in the connecting stud 1 by designing the abutments 29 defined by the ends of the slots in the spring arms 25 for engagement with the free end of the connecting stud, as shown in Fig. 6. The abutments 29 thus retain the spring catch in fixed position on the connecting stud, whereupon the generally arched base portions 21a, 21b may be pressed toward flattened condition as necessary to snap the tongues 31, 32 thereon into tensioned, positive locked engagement in the transverse aperture 3 in said connecting stud. In any case, the flat connecting stud 1 as thus received in the slot or opening 28 in the spring catch 20 maintains the spring catch in fixed, nonrotatable, attached position thereon while the tongues 31, 32, received in interlocking relation in the transverse aperture 3 in said connecting stud, as aforesaid, provide a positive lock of the spring catch in such attached position.

From the foregoing, it will be appreciated that the described construction of the spring catch provides a highly simplified arrangement for attaching the same onto the connecting stud 1 of part A in a minimum of time and effort and without the use of bolts, screws, nuts, rivets, or other auxiliary fastening means. It will be understood that as many of such spring catches 20 as necessary are attached to similar connecting studs 1 provided on part A along the path which the part B extends in its mounted position thereon. The snap fasteners 10 are secured to the part B as illustrated in Figs. 6 and 7 in a manner whereby the flat shank of a snap fastener extends at right angles to the spring arms 25 of its associated spring catch 20. Accordingly, in completing a mounting of a trim panel, toe plate or other part B, the application of a snap fastener 10 to the associated spring catch 20 is such that the rounded diverging guide surfaces 13 on the snap fastener are adapted to cam against the rounded cam surfaces 26 on the extremities of the spring arms 25 to cause said spring arms to spread apart as necessary to permit the snap fastener 10 to pass therebetween to a position in which the rounded jaws 26 on said spring arms snap into and are snugly seated in the similarly shaped rounded recesses 15 on the opposing edges of the snap fastener shank as shown in Fig. 6. The rounded recesses 15 define the spaced shoulders 16, as aforesaid, and accordingly the engagement of the rounded jaws 26 with such spaced shoulders provides a rigid connection in which the snap fastener is fixedly retained in attached position against axial displacement in either direction. Consequently, the supported toe plate B, trim panel or the like, is firmly and rigidly mounted in spaced relation to the supporting part A against movement either toward or from said supporting part A. Preferably the snap fastener 10 in such snap fastened engagement with the spring arms 25 of the spring catch is so arranged that a flat face thereof is disposed in abutting engagement with a flat face of the connecting stud 1, as shown in Fig. 7, to increase the rigidity of the completed joint or connection. In a similar manner, each of the snap fasteners 10 attached to the trim panel, toe plate or other part B is connected to its associated spring catch 20 over the area which said part B extends in mounted position on part A so that the completed mounting comprises a plurality of spaced resilient joints or connections provided by cooperating spring catches 20 and snap fasteners 10 in accordance with the invention.

In the event that it becomes necessary or desirable to remove the part B from mounted position, as for repairs or replacement of a member concealed thereby, said part B is readily removed by a suitable force thereon to move each snap fastener in a reverse axial direction as necessary for the guide surfaces 13 on the edges thereof to cause the spring arms 25 of the spring catch to spread apart sufficiently to pass the snap fastener from attached relation therewith. Thereafter, said part B may be reinstalled in the same mounting in a repetition of the foregoing described procedure for applying the snap fasteners 10 to the associated spring catches 20.

The spring catches 20 preferably are constructed of relatively thin sheet metal, the thickness of which is selected according to service requirements and the predetermined size of the parts secured. These spring catches are most effective when provided of spring metal suitably spring tempered and otherwise treated to give the desired toughness and hardness, particularly in the case of devices which are put to heavy duty in installations where extreme vibratory motion takes place. A cheap but effective fastener may be provided from cold rolled metal, such as cold rolled steel, which is untempered but of a spring metal nature and capable of providing an effective and reliable fastening means adapted for a long period of satisfactory service and use.

While the invention has been described in detail with a specific example, such example is intended as an illustration only, since it will be apparent to those skilled in the art that other modifications in the construction, arrangement and general combination of parts may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning, and range of equivalency of the claims intended to be embraced therein.

What is claimed is:

1. A fastening construction comprising a part provided with a connecting stud having a transverse aperture, a spring catch attached to said connecting stud comprising a sheet metal body bent to define a base and spring arms adapted for snap fastening engagement with a cooperating part, said base and spring arms having an opening receiving said connecting stud in fixed relation and a tongue on said base receivable in said transverse aperture in the connecting stud to lock the spring catch in such attached position.

2. A fastening construction comprising a part provided with a flat connecting stud, a spring catch attached to said connecting stud comprising a sheet metal body bent to define a base and spring arms adapted for snap fastening engagement with a cooperating part, said base and spring arms having a slot receiving said flat connecting stud in fixed relation, and a tongue adjacent said slot in said base engaging the connecting stud to secure the spring catch in attached position thereon.

3. A fastening construction comprising a part provided with a flat connecting stud, a spring catch attached to said connecting stud comprising a sheet metal body bent to define a base and spring arms adapted for snap fastening engagement with a cooperating part, said base and spring arms having a slot receiving said flat connecting stud, and cooperating tongues on opposite sides of the slot in said base engaging said connecting stud to secure the spring catch in attached position thereon.

4. A fastening construction comprising a part provided with a flat connecting stud having a transverse aperture, a spring catch attached to said flat connecting stud comprising a sheet metal body bent to define a base and spring arms adapted for snap fastening engagement with a cooperating part, said base and spring arms having a slot receiving said flat connecting stud, and cooperating tongues at opposite sides of the slot in said base extending into the transverse aperture in the connecting stud to secure the spring catch in attached position thereon.

RICHARD A. HARTMAN.

REFERENCES CITED

The following references are of record in the file of this patent:

UNITED STATES PATENTS

| Number | Name | Date |
|---|---|---|
| 2,015,049 | Carr | Sept. 17, 1935 |
| 2,097,988 | Ross et al. | Nov. 2, 1937 |
| 2,128,005 | Lombard | Aug. 23, 1938 |
| 2,147,779 | Van Uum | Feb. 21, 1939 |
| 2,275,773 | Kost | Mar. 10, 1942 |
| 2,329,688 | Bedford | Sept. 21, 1943 |
| 2,403,881 | Tarbox | July 9, 1946 |
| 2,414,986 | Tinnerman | Jan. 28, 1947 |